United States Patent

[11] 3,566,753

| [72] | Inventor | Joachim Mantke<br>Meiningenallee 5, Berlin 19, Germany |
|---|---|---|
| [21] | Appl. No. | 762,585 |
| [22] | Filed | Sept. 25, 1968 |
| [45] | Patented | Mar. 2, 1971 |
| [32] | Priority | Sept. 28, 1967 |
| [33] | | Germany |
| [31] | | P 16 32 243.3 |

[54] METHOD AND APPARATUS FOR PRODUCING FILTERS FOR CIGARETTES
3 Claims, 3 Drawing Figs.

[52] U.S. Cl............................................. 93/1,
93/36.01, 93/77, 53/175
[51] Int. Cl....................................................... B31b 49/00,
B31d 5/00, B31b 7/74
[50] Field of Search........................................ 93/1 (C),
77 (.5), (CL), 36.01; 53/175

[56] References Cited
UNITED STATES PATENTS

| 3,122,974 | 3/1964 | Rowlands.................... | 93/1(C) |
| 3,361,138 | 1/1968 | Metzinger.................... | 93/1(C) |
| 3,370,514 | 2/1968 | Rome.......................... | 93/77(.5) |
| 3,464,324 | 9/1969 | Pinkham...................... | 93/1(C) |

FOREIGN PATENTS

| 1,096,275 | 12/1960 | Germany..................... | 93/77(.5) |

*Primary Examiner*—Wayne A. Morse, Jr.
*Attorney*—Malcolm W. Fraser

ABSTRACT: Method and apparatus for producing filters for cigarettes in which a chamber containing a flowable pulverulent effective filter material inside a sheath enveloping the entire filter is closed at each end by a plug of permeable material which likewise has a filtering effect.

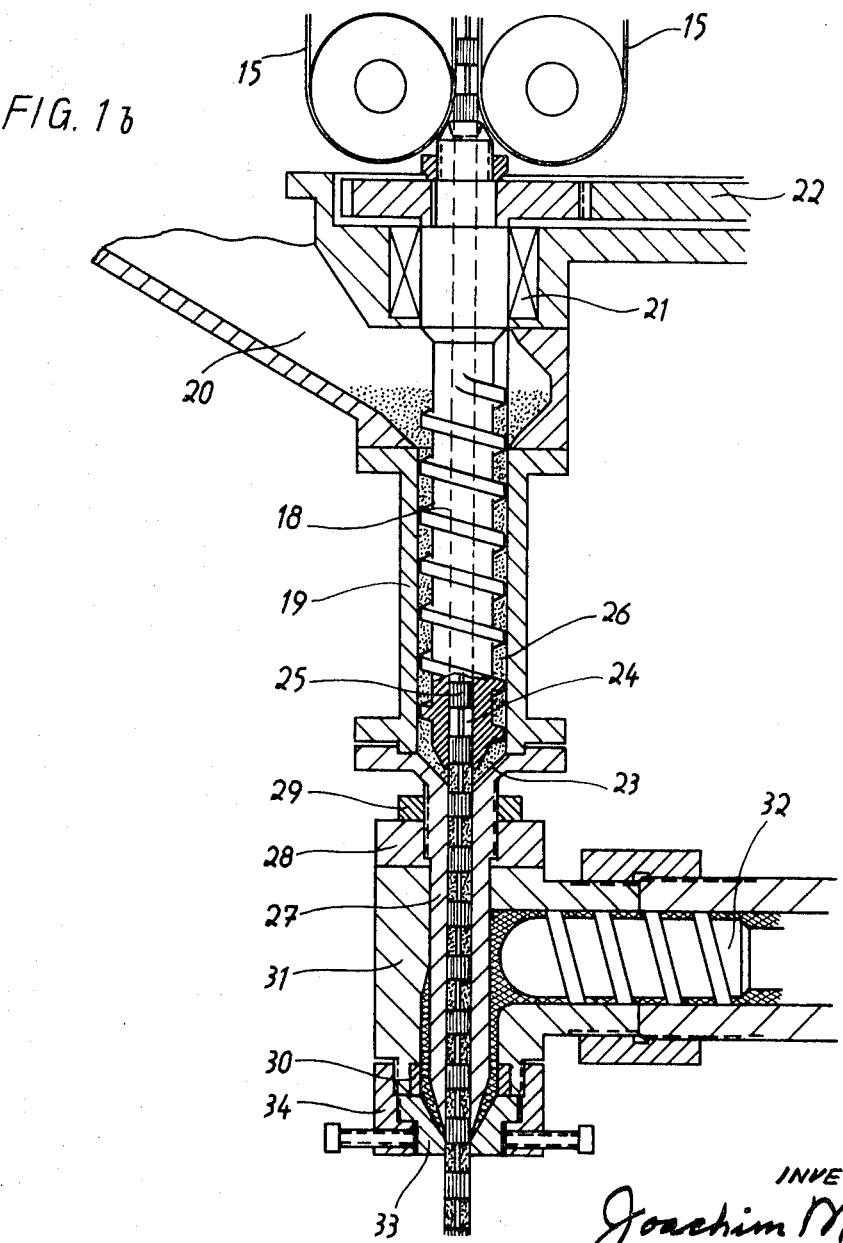

METHOD AND APPARATUS FOR PRODUCING FILTERS FOR CIGARETTES

Cigarette filters of the above described kind have been proposed on repeated occasions; by virtue of their incorporating a suitably chosen flowable pulverulent filter material are substantially superior in effectiveness and selectivity to conventional filters consisting of sections of a fiber tow, particularly of cellulose acetate filaments. However, efforts to use such filters in practice have failed, principally because difficulties are encountered in producing them economically in continuous process on a large enough scale for industrial use.

None of the methods of production that has been proposed ensures that the chambers between the two terminal plugs is completely filled with the loose filter material in a manner preventing this material from shifting inside the chamber and from forming channels through which the smoke preferentially passes without being subjected to the desired filtering effect.

The present invention provides a method which permits such filters to be fully automatically produced on an industrial scale, and which avoids the above-mentioned difficulties. The invention also concerns machines for performing the method.

In principle the proposed method consists in that spaces of the required axial length of said chambers are opening up between consecutive sections of a column of filter tow, which sections are fed in continuous sequence to a filter-making machine for the purpose of forming the terminal plugs in the completed filter, by intermittently interrupting the feed of said sections and simultaneously axially moving either the portion of the column preceding or that following the division between consecutive sections to open up an intervening space, that the column formed by this sequence of sections now separated by spaces is conveyed past a gravity feed for feeding the flowable pulverulent filter material into said spaces, preferably with the application of pressure, as the column descends past said gravity feed, in that the column thus constituted is then enveloped by a sheath, preferably consisting of a plastics foil, which encloses the spaces and thus forms the chambers and in that said sheathed column, as soon as the sheath-forming plastics material has set, is cut into lengths each containing one half of two consecutive plug sections and an intervening chamber completely filled with the flowable filter material.

In a first embodiment of this method the intervening spaces are formed during the actual feeding of the plug-forming sections of a strand of fibers into a vertical retaining shaft by intermittently feeding said plug sections at prescribed intervals of time, preferably whilst simultaneously accelerating the column of plug sections that have already entered the shaft and between which spacing members have been inserted during the intermissions in the feeding of the plug sections into said shaft, said spacing members establishing the required spacing of consecutive plugs and remaining thereinbetween when the chambers thus formed are subsequently closed, without hindering the filling of the spaces with the filter material as the column passes the gravity feed.

In an alternative embodiment of the proposed method relative movement between the closely stacked contiguous plug members forming a column in relation to a preceding portion of the column in which spaces for forming the chambers have already been opened up can also be generated by passing the first-mentioned portion of the column through a vertically reciprocating sleeve which extends to the feed opening for the introduction of the flowable pulverulent filter material, said guiding sleeve by virtue of its reciprocation being lifted away from the preceding portion of the column of plugs to open a space of a length equaling that of the chambers that are to be formed between consecutive plugs, the space thus opened up being immediately filled with the flowable material, whereas during the descent of the guiding sleeve the column of plugs contained therein applies compression in a desirable manner to the filter material filled into the final chamber at the end of the preceding column which is simultaneously pushed further down.

BRIEF DESCRIPTION OF THE DRAWINGS

FIG. 1b is the lower portion of the same apparatus in which the spaces that have been opened up are filled with the filter material and a plastics sheath is formed around the column.

DESCRIPTION OF THE PREFERRED EMBODIMENTS OF THE INVENTION

Figure 1A:
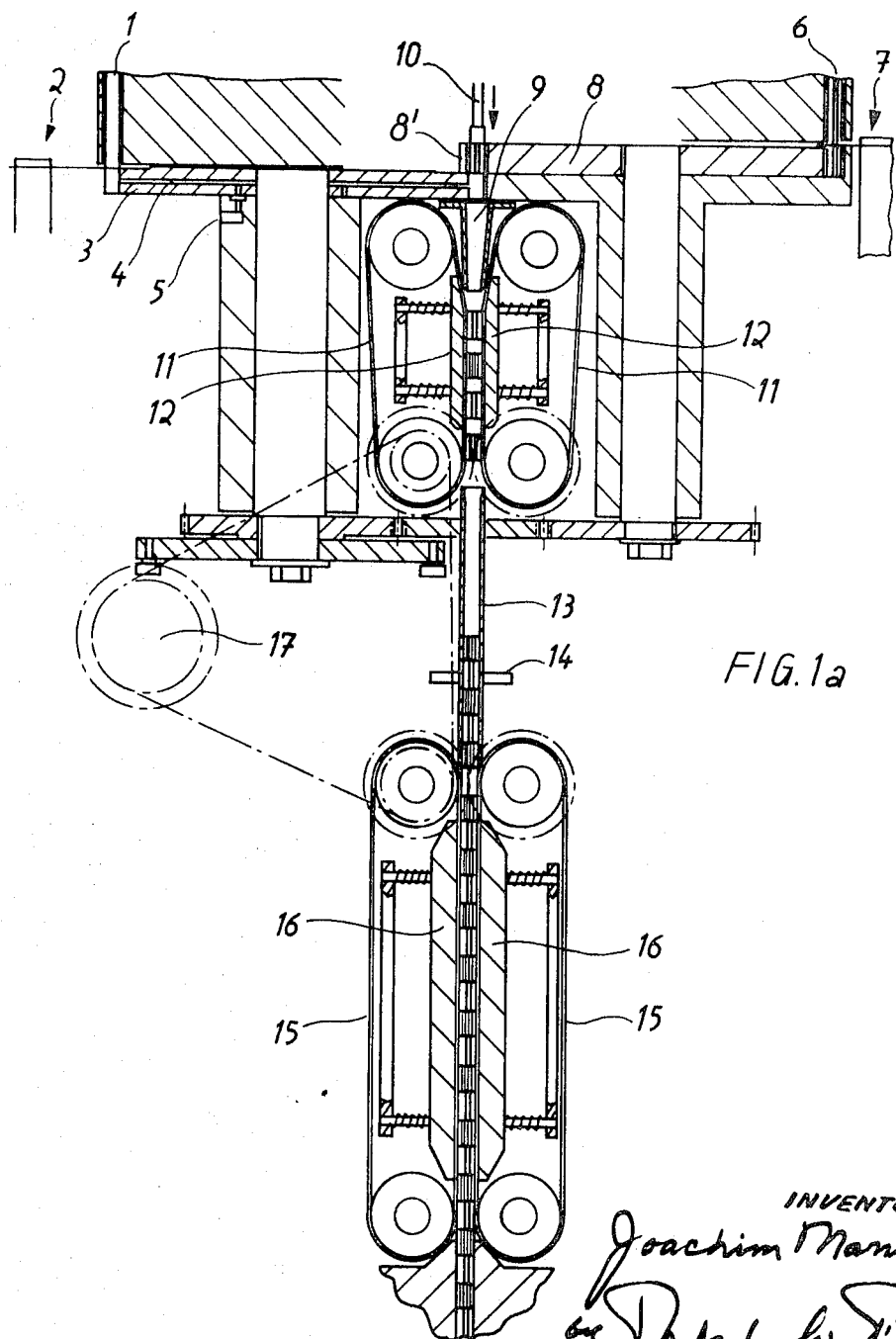
FIG. 1a is an axial section of the upper portion of apparatus, separately shown for reasons of space, for feeding plug sections and for forming the axial spaces between consecutive plug sections in a first alternative of the proposed method.

In the embodiment of the machine illustrated in FIGS. 1a and 1b a continuous strand 1 of conventional filter material from which the plugs are to be formed is fed to the machine and cut into sections of twice the length of a plug by a conventional cutting device 2 which is merely schematically shown. By suction acting through channels 4 connected at 5 to a source of vacuum pressure these plug sections are retained on the periphery of an automatically indexing turntable 3 which is as thick as the sections are long and the latter are carried by the indexing of the turntable to an entry point above a mouthpiece 9 pointing vertically downwards. The indexing turntable 3 is provided around its periphery with an arbitrary but suitably chosen number of retaining points for the cut plug sections. A second indexing turntable 8 which partly overlaps the top of the turntable 3, and which is of a thickness corresponding to the axial length of the chambers that are to be formed simultaneously feeds to the mouthpiece sections of a rigid, for instance plastics strand 6 of suitable, say star-shaped, cross section which have been cut to the length of the chambers from a continuous strand 6 by a cutting device 7, and which are retained in recesses on the indexing turntable 8, defined for instance by a ring embracing the turntable 8. The two indexing turntable 3 and 8 synchronously operate in such a way that at given intervals of time a plug section and a spacing section arrive in position vertically aligned above the aforementioned mouthpiece, whence they are both pushed into the mouthpiece by a plunger 10 whilst at the same time the suction acting at this point of the turntable 3 for retaining the plug section is cut off.

The drive means of the turntable 3 and 8 comprising gearwheels and an indexing screw are only schematically shown.

The two sections falling through the mouthpiece 9 then pass through a gap between two cooperating parallel portions of two endless belts 11 which are urged by spring guide means 12 against opposite sides of the continuous column of plug sections and interposed spacers, the two belts thus determining the rate of travel of this column before transferring the same to a retaining shaft 13. In order to ensure that this shaft is always filled with a column of plug and spacer sections, a sensing contact 14 is provided.

Following this contact the column of plug and spacer sections passes between pairs of endless belts 15 contrived in analogous manner to the belts 11 and associated with spring guide means 16 which similarly urge the belt portions facing the column into contact therewith, said belts travelling at a speed which may be about 15 percent slower than that of the belts 11 and thereby also ensuring that the resultant retarding effect will keep the shaft 13 sufficiently filled.

All the belts and the turntables are driven by a common main drive shaft 17.

The column issuing from the gap between the two belts 15 continues to descend through a central bore in a proportioning feed screw 18 which surrounds the column, and which revolves in a cylindrical casing 19 into which the flowable pulverulent material that is to be filled into the spaces between consecutive plug sections is introduced from a suitable hopper 20 not shown in detail. The proportioning screw is mounted at 21 in the frame of the machine and, as is schematically shown at 22, it is driven by a gearwheel likewise associated with the central drive means of the machine.

The bottom end of the proportioning screw tapers to form a conformably shaped coned annular channel 23 between the screw and its casing. This channel communicates with the central bore through which the column passes, and in which the spaces between the plug sections 25 which have been kept open by the spacing elements 24 fill with the flowable material by gravity, complete filling of each chamber being assured by suitable controlling the speed of advance of the column and the speed of revolution of the proportioning feedscrew with due regard to the cross sections of the communicating openings of the annular channel 23. This annular outlet channel is intermittently closed by the downward passage of a plug section 25.

Below this filling point the column passes through means which provide it with the enveloping plastics sheath which then closes the chambers and ensures the cohesion of the entire column.

These means comprise a central passage for the column of plug sections and spacers through a mandrel 27 adjustable by a mandrel holder 28 associated with a counternut 29 and a centering ring 30, the mandrel being embraced by a heatable extruder head 31. An extruding feed screw 32 disposed on one side of the extruder head feeds the latter with a liquid plastics material which is then applied to the column through an extrusion die 33 which determines the external diameter of the resultant plastics sheath and which is adjustable by a screw cap 34. The column leaving the extruder head is then cooled in a manner not shown and finally cut into individual filters comprising one half of each of two plug sections, and the filter material contained thereinbetween.

Figure 2:
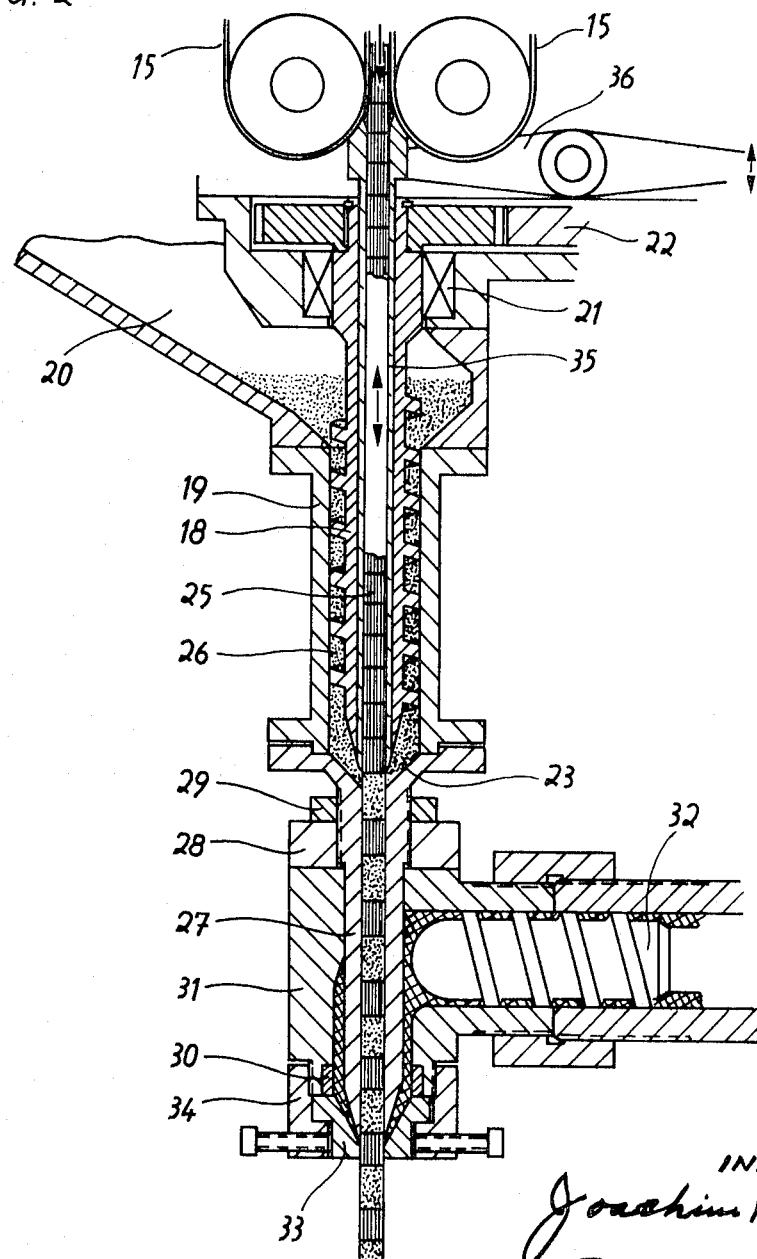
FIG. 2 is a representation corresponding to that in FIG. 1b of the lower portion of apparatus for performing the second embodiment of the method, the upper portion of the apparatus which is simpler than that in FIG. 1 not being shown.

The embodiment of the proposed apparatus shown in FIG. 2 differs from that which has above been described by the manner in which the chambers that are to be filled with the flowable filter material are formed.

The following description of this second embodiment is therefore confined to the parts which differ from those shown and described by reference to FIG. 1.

In this embodiment the feed means for spacer members is omitted so that a continuously unbroken column of plug sections descends between the conveyor belts 15 which are maintained in resilient contact with the column in the same way as in FIG. 1b and thus determine the speed of descent of the column into a guiding sleeve 35 which is kept filled with plug sections by retaining the same in a gentle frictional grip, said sleeve being intermittently raised and lowered by a suitably reciprocating lever 36 through a distance corresponding to the length of a chamber, a motion which is naturally also transmitted to the feeder mechanism above said sleeve. During the upward motion the entire column of plug sections which is contained in the guide sleeve and which terminates just above the coned annular entry opening 23 is raised by virtue of its frictional fit in the enveloping walls of the sleeve, and by uncovering the entry 23 this permits the flowable material to fill the space which is thus opened up, whereas during the following descent of the guiding sleeve for further advancing the column the material inside the chamber is compressed in desirable manner, the column thus formed being then further treated as already described with reference to the drawings illustrating the first embodiment.

In both embodiments all the moving parts of the machine operate in synchronized cycles, so that the entire machine is fully automatic in a operation.

It will be readily understood that the scope of the invention is not intended to be limited to the embodiments of machines for performing the proposed method that have been described. In various respects modifications within the scope of the present inventive idea can be devised.

More particularly, the described apparatus, subject to slight and obvious modifications, would also be suitable for enveloping an ordinary filter tow with a plastics sheath, in which case all those parts of the machine which are provided for forming the chambers and for filling the flowable powered filter material into the same would be omitted, the formation of the filter tow from the starting material being very much simplified by feeding this veillike starting material through a tapering feed nozzle to the point where the plastics sheath is extruded around the same.

I claim:

1. A method of producing combination filters for cigarettes, in the form of chambers filled with a flowable pulverulent filter material between two filter plugs, characterized in that spaces of the required axial length of said chambers are opened up between consecutive sections of a column of fiber material, which sections are fed in continuous sequence to a filter-making machine for the purpose of providing the terminal plugs in the completed filter, by intermittently interrupting the feed of said sections and simultaneously axially moving either the portion of the column preceding or that following the division between consecutive plug sections to open and predetermine the length of said space, that the column formed by the sequence of separated sections is conveyed past a gravity feed for feeding the flowable pulverulent filter material which fills said spaces as the column passes said gravity feed, preferably with the application of additional compression, in that the column thus constituted is then enveloped with a thin film of heated liquid plastics material providing a sheath which encloses the spaces and thus forms the chambers and in that said sheathed column, as soon as the sheath-forming material has set is cut into lengths each containing one half of two consecutive plug sections and an intervening chamber containing the filter material.

2. A method according to claim 1, characterized in that the spaces are formed between said plug section sections by feeding said plug sections at prescribed intervals of time into a vertical retarding shaft in the machine, preferably whilst simultaneously accelerating the column of plug sections that have already entered the shaft, and between which spacing members in the form of star-shaped bodies have been inserted during the intermissions in the feeding of the plug sections into said shaft, said spacing members establishing the required spacing of consecutive plugs and remaining therein between when the chambers thus formed are subsequently closed.

3. A method according to claim 1, characterized in that a column of closely consecutive plug sections is gripped with a slight friction lifting said columns away from the preceding column of plugs by a distance equaling the length of the chambers that are to be formed between consecutive plugs and the space thus opened up being filled with the flowable pulverulent filter material.